G. Hinman,
Scissors Sharpener.
No. 19,467.  Patented Feb. 23, 1858.

UNITED STATES PATENT OFFICE.

GEORGE HINMAN, OF NEW HAVEN, CONNECTICUT, ASSIGNOR TO HIMSELF AND JNO. H. PARDEE, OF SAME PLACE.

SCISSORS-SHARPENER.

Specification of Letters Patent No. 19,467, dated February 23, 1858.

*To all whom it may concern:*

Be it known that I, GEORGE HINMAN, of the city and county of New Haven, in the State of Connecticut, have invented a new and useful Improvement in Scissors-Sharpeners; and I do hereby declare that the following is a full, clear, and exact description of the construction, character, and operation of the same, reference being had to the accompanying drawings, which make a part of this specification, in which—

Figure 1:
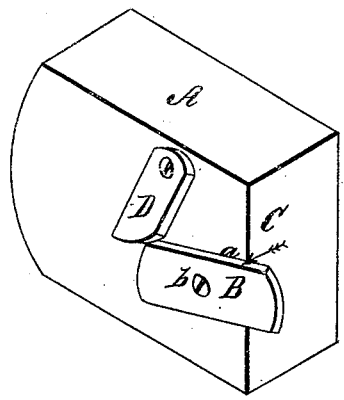
Figure 2:
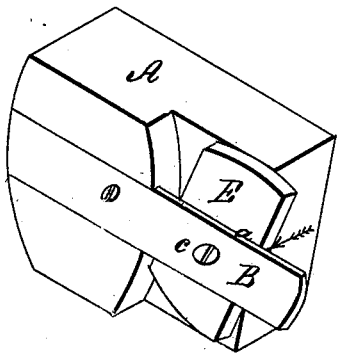
Figure 3:
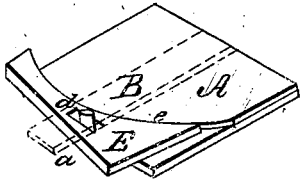

Figure 1, is a perspective view of one form of the sharpener, where the cutting edge is forced to, and retained in, its position by a cam lever, to adjust the blade to the desired angle with a stationary, or fixed guide. Fig. 2, is a perspective view of a form of the sharpener, where the cutting edge is fixed or stationary, and the guide is moved to adjust it to the desired angle with the stationary blade. Fig. 3, is a perspective view of another form of Fig. 2, showing the guide as working on a curve to adjust it to the required angle.

My improvement consists in so constructing the sharpener that the cutter and guide may be readily adjusted to any required angle, either by having the cutting blade moved, and secured, by a cam lever, or its equivalent, to adjust the angle with a stationary, or fixed, guide;—or, by having the guide susceptible of being moved to adjust the angle with a stationary or fixed, cutting blade, for the purpose of suiting it to the bevels of the cutting edges of any kind of scissors, or shears.

I make the block, A, of wood, or any other suitable material, substantially in the form shown in Fig. 1, or that shown in Fig. 2.

I make the cutting blade, B, (for paring off, or abrading the surface of the edge of the scissors blade,) of cast steel, and temper it in a proper manner. And, I bevel the cutting edge, as shown at *a*, Figs. 1 and 2, suitable for paring off, or abrading, the surface of the edge of the scissors blade so as to bring it to a keen edge, I make this beveled edge, *a*, smooth. I attach this blade, B, to the block, A, by a joint pin, or screw, as shown at *b*, Fig. 1, so that it may be moved to adjust it to the required angle with the stationary guide, C, to give the desired bevel to the edge of the scissors; and I secure it in that position by a cam lever, or support, as seen at D, Fig. 1, (the screw being sufficiently tight to sustain it). Or, I attach the blade, B, in a permanent manner, to the block, A, as shown in Fig. 2, and have the guide, E, adjustable on a joint pin, or screw, *c*, so that it may be set to the required angle with the stationary blade, B, Fig. 2, to give the desired bevel to the edge of the scissors. Or, I have the movable guide, E, sustained by a stud, or screw, passing through a slot in the guide, as shown at *d*, Fig. 3, (this stud or screw also sustains the blade B,) and I have the guide, E, work on a curve, *e*, to adjust the guide to the required angle with the stationary blade, B, (which is indicated by dots, but it will be the same as shown at B, Fig. 2,) to give the desired bevel to the edge of the scissors. (The form and arrangement of the adjustable guide shown in Fig. 3, will probably be preferred to that shown in Fig. 2.)

To use this sharpener, (when constructed as represented in either of the figures), I adjust the cutter, B, in Fig. 1, (as described,) or the guide, E, in Figs. 2 and 3, (as described,) so as to form the required angle to give the desired bevel to the edge of the scissors, rest the block, A, on the table, or any other convenient support, in the position represented in Figs. 1 and 2, place the flat side of the scissors blade against the guide, with the edge against the cutter, and draw it from heel to point, in the direction indicated by the dart, as many times as may be necessary to give it a keen edge, and repeat the same for the other blade. (The wire edge will be taken off the first time they are shut.)

The advantages of my improvement, consist in, that the cutter, B, Fig. 1, may be reversed, (by simply turning the cam lever, D, a little farther back than shown in the drawing,) so that the other end may be used, thus making it equivalent, in durability, to two instruments; and, in that in either case the screw, or screws, may work in slats in the cutter, so that different points on the cutting edge may be brought into use, to increase its durability; and, in that the angle can be adjusted, so as to give any desired bevel to the edge of the scissors blade, and in that as the sharpening is done outside, any size of scissors, or shears, (where the instrument has sufficient strength,) may be sharpened on it, when made in either of the three forms; (and if necessary, when the cutters get dull they may be taken off and ground, the same as any other smooth edge.)

What I claim as my invention, and desire to secure by Letters Patent, is—

Making, or producing, a scissors sharpener, as a new article of manufacture, when constructed, and made to operate, substantially, in either of the ways herein particularly described, and set forth.

GEORGE HINMAN.

Witnesses:
JOHN H. PAEDIE,
R. FITZGERALD.